US007007068B2

(12) United States Patent
Morkel

(10) Patent No.: US 7,007,068 B2
(45) Date of Patent: Feb. 28, 2006

(54) SYSTEMS AND METHODS FOR MANAGING CONTACT INFORMATION

(75) Inventor: Andre Morkel, Somerville, MA (US)

(73) Assignee: Peoplestreet, Cambridge, MA (US)

( * ) Notice: Subject to any disclaimer, the term of this patent is extended or adjusted under 35 U.S.C. 154(b) by 733 days.

(21) Appl. No.: 09/893,296

(22) Filed: Jun. 27, 2001

(65) Prior Publication Data

US 2002/0052921 A1 May 2, 2002

Related U.S. Application Data

(60) Provisional application No. 60/214,602, filed on Jun. 27, 2000.

(51) Int. Cl.
   *G06F 15/16* (2006.01)
(52) U.S. Cl. .............. 709/206; 709/203; 709/217; 709/219; 709/223; 709/224; 709/229; 709/245; 709/246
(58) Field of Classification Search ............... 709/206, 709/229, 246, 223, 224, 245, 217, 219, 203; 379/67.1
   See application file for complete search history.

(56) References Cited

U.S. PATENT DOCUMENTS

| 6,167,435 A * | 12/2000 | Druckenmiller et al. ..... 709/206 |
| 6,353,852 B1 * | 3/2002 | Nestoriak et al. ........... 709/206 |
| 6,405,243 B1 * | 6/2002 | Nielsen ....................... 709/206 |
| 6,427,164 B1 * | 7/2002 | Reilly ......................... 709/206 |
| 6,564,264 B1 * | 5/2003 | Creswell et al. ............ 709/245 |
| 6,792,082 B1 * | 9/2004 | Levine ....................... 379/67.1 |

FOREIGN PATENT DOCUMENTS

WO    WO 00/67105    11/2000

* cited by examiner

*Primary Examiner*—Ario Etienne
*Assistant Examiner*—Yves Dalencourt
(74) *Attorney, Agent, or Firm*—Fish & Neave IP Group Ropes & Gray, LLP

(57) ABSTRACT

A service provider maintains a database with subscribers' updated contact information, such as address book entries and other personal and business information. When a user's information changes, subscribers on a recipient list are automatically updated without any user intervention. The subscribers' anonymity is assured by correlating contact information in the provider's database with encrypted subscriber ID's, such as hashed e-mail addresses.

17 Claims, 11 Drawing Sheets

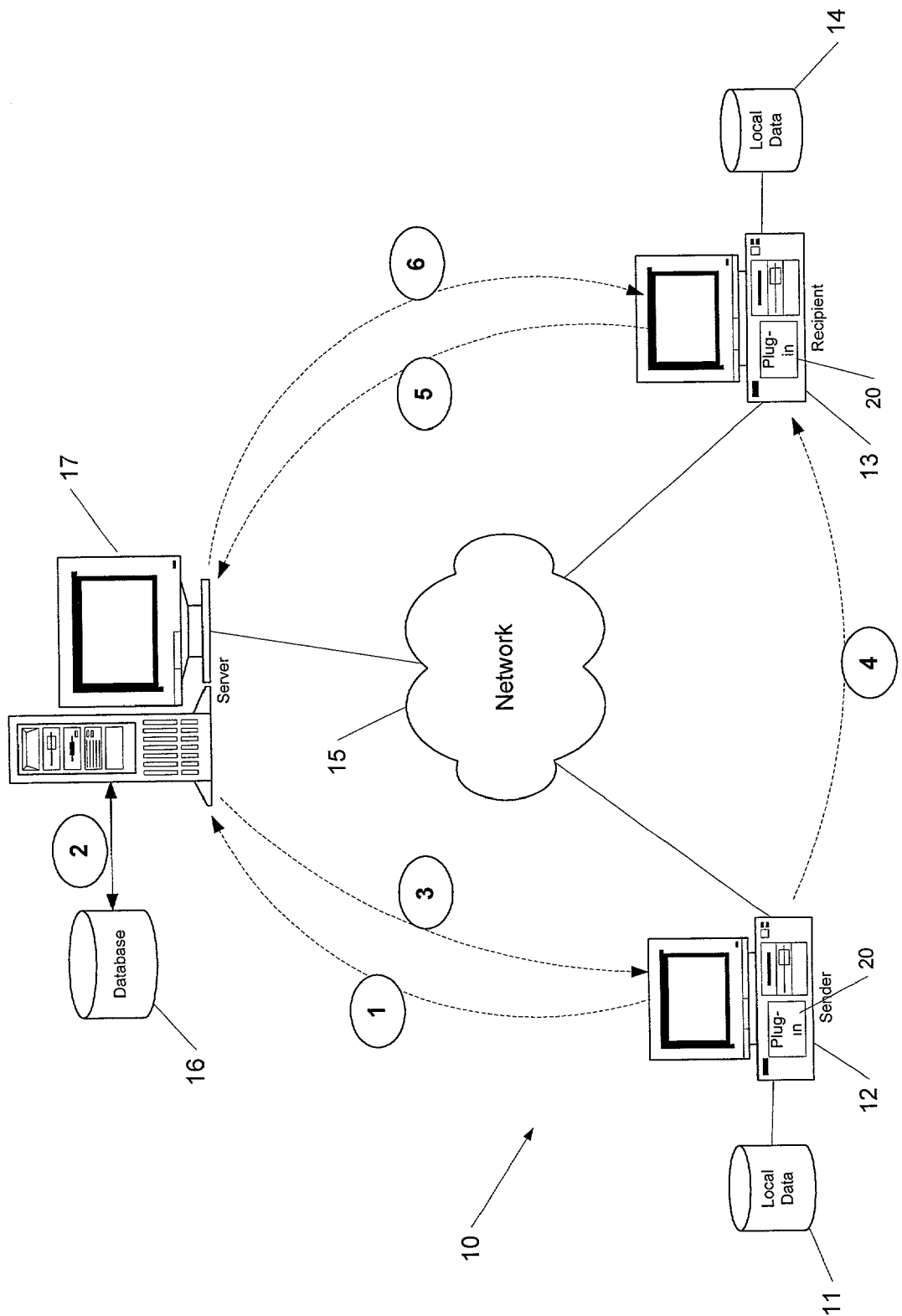

To: norman@cambridgeincubator.com;
jimmy@gmc.com; chevy@chase.com
From: bob@yahoo.com
Subject: Hi friends Body:
Hi all,
I wanted to let you know that I've moved cities and jobs. My new contact details are included in the livecard link attached.
Cheers,
Bob ---
Bob Smith
800 555-1212

---

My business livecard is included.

Fig. 8

To:     norman@cambridgeincubator.com;
        jimmy@gmc.com; chevy@chase.com
From:   bob@yahoo.com
Subject: Hi friends Body:
Hi all,
I wanted to let you know that I've moved cities and jobs. My new contact details are included in the livecard link attached.
Cheers,
Bob

---

Bob Smith
800 555-1212

---

My business livecard is included. Click on this link to receive:

http://peoplestreet.newuser.asp?id=bob876

Fig. 9

| To: | norman@cambridgeincubator.com; jimmy@gmc.com; chevy@chase.com |
|---|---|
| From: | bob@yahoo.com |
| Subject: | Hi friends |

Body:
Hi all,
I wanted to let you know that I've moved cities and jobs. My new contact details are included in the livecard link attached.
Cheers,
Bob Bob Smith
800 555-1212

My business livecard is included. Click on your link:

norman@cambridgeincubator.com ➜ http://peoplestreet.newuser.asp?e=norman%40cambridgeincubator.com&id=bob876&checksum=5642456 jimmy@gmc.com ➜ http://peoplestreet.newuser.asp?e=jimmy%40gmc.com &id=bob876&checksum=2349432 chevy@chase.com ➜ http://peoplestreet.newuser.asp?e=chevy%40chase.com &id=bob876&checksum=9084241

SYSTEMS AND METHODS FOR MANAGING CONTACT INFORMATION

CROSS-REFERENCE TO OTHER PATENT APPLICATIONS

This application claims the benefit of U.S. provisional application No. 60/214,602, filed Jun. 27, 2000, which is incorporated herein by reference.

FIELD OF THE INVENTION

The present invention relates generally to systems and methods for managing personal information, and more particularly to systems and methods that controllable and securely acquire, handle and maintain contact information. The proposed contact information management systems and methods operate with e-mail applications, personal information managers and wireless devices.

BACKGROUND OF THE INVENTION

With the increasing mobility of the population and more frequent job changes, it has become an even greater challenge maintain and track information such as names, addresses and telephone numbers of businesses and personal and business contacts. A number of contact management tools, also referred to as address books, personal information managers, record keepers, organizers, and schedulers, are currently commercially available. Examples of information that may be stored in a personal information manager include a person's name, title, company name, company address, home address, telephone and facsimile numbers, e-mail address, scheduled activities, and notes. Commercially available personal information managers include "Maximizer" from Maximizer Technologies, "Act" from Symantec Corporation, "Janna Contact" from Janna Systems Inc. of Toronto, Ontario, Canada, "Schedule+" from Microsoft Corporation of Redmond, Wash., USA, and "Lotus Organizer" from IBM Corp. of Armonk, N.Y., USA. Personal information managers may also be a part of larger application programs, such as, for example, the Netscape web browser from Netscape Communications Corp. of Mountain View, Calif., USA and Lotus Notes from IBM Corp. The personal information manager capability in the Netscape web browser is referred to as "Address Book" and in the Lotus Notes program is referred to as "C&S" or "Calendar and Scheduler."

A recent service provided on the Internet is the storage and maintenance of a personal information on a server, accessible via the Internet. With this system, the owner of the personal information is responsible for maintaining the information and may change the information that is viewable in the address books of other uses of the service. A number a web portals (e.g., Yahoo! of Santa Clara, Calif., and Excite Inc. of Redwood City, Calif.) have incorporated address book and calendaring features into the services provided by these portals. These web portals further offer synchronization software which provides the capability to synchronize copies of personal information stored in on PDAs, PIMs, and the remote server operated by the web portal.

These and other conventional personal information managers, however, often lack the security features to protect the personal information from unwanted access and require periodic synchronization with all intended recipients of the personal information, which can interfere with the tasks performed on the recipient's computer. This is inefficient and a source of considerable inconvenience and annoyance for the user.

It would therefore be desirable to provide systems and methods that allow a sender to control the time and frequency of transmission of updates of personal information to only those recipients selected by the sender that have not yet received such updated personal information, and to provide secure access to the personal information only for the selected recipient or recipients.

SUMMARY OF THE INVENTION

According to one aspect of the invention, a user can send and/or update personal information to selected recipients by attaching a respective message to an e-mail directed to the recipient(s) or by checking a field in the e-mail indicating that personal information, e.g., in form of an electronic business card, is included. On the user's computer, an e-mail client is in communication with a server, for example, via the Internet, with the server storing the personal information data by associating the personal information with a secure identifier of the user, such as a hash of the user's e-mail address. When the recipient opens the received e-mail, the recipient can securely obtain the user's updated personal information from the server. The e-mail client and/or the server can maintain a record of those recipients that are already in possession of the updated personal information, thereby avoiding unnecessary and annoying duplication of transmission of personal information to the recipients.

According to another aspect of the invention, in a method for secure management of contact information via a network, a client prepares an e-mail with a recipient's e-mail address, and indicates in the e-mail that contact information is included. A server in communication with the client vi the network associates a transaction ID with the contact information, stores a hash of the recipient's e-mail address received from the client and associates the hashed e-mail address with the transaction ID. The server then forwards the e-mail with the transaction ID to the recipient, receives from the recipient a message that includes the transaction ID, produces a hash of the recipient's e-mail address received from the recipient, and if the hashed e-mail address and transaction ID received from the recipient match the stored hash of the recipient's and the transaction ID, forwards the contact information to the recipient.

According to yet another method for secure management of contact information at a server connected to a network, the server receives contact information from a client via the network, associates a transaction ID with the received contact information, computes at least one hashed e-mail address of an intended recipient specified by the client, and associates the hashed e-mail address with the transaction ID. The server may then compute a hash of the recipient's e-mail address received from the recipient, match the hashed recipient's e-mail address received from the recipient with the transaction ID, and transmit the contact information to the recipient.

According to yet another aspect of the invention, a system for disseminating contact information via a network includes a server that is connected to the network and stores the contact information. A sender's computer is also connected to the network and transmits via the network to a recipient's e-mail address an e-mail that includes an identifier associated with the sender's contact information. A recipient's computer that is connected to the network receives the e-mail with the identifier and accesses the server via the network and retrieves from the server the contact information by providing the server with the identifier. The server can store an association between the contact information and a recipient's e-mail address based on an encrypted value of the recipient's e-mail address, such as a hash of the e-mail address. In this way, the server does not know the identity of the recipient before the recipient requests the contact information from the server.

Embodiments of the invention may include one or more of the following features. The sender may indicate by a message appended to the e-mail and/or by a field checked in the e-mail window that contact information is included. The contact information may be targeted for a specified recipient or for a plurality of recipients listed on a recipient list. The server may retain copies of the contact information and/or a history of the contact information, with the history being derived from transaction ID's. The recipient—in response to receiving the contact information from a sender—may transmit updated contact information to the sender. The client may specify different security settings for the contact information, with respective contact information displayed at the recipient depending on the security setting. The server, when receiving updated contact information for a particular recipient on a recipient list, may automatically send an e-mail to the remaining recipients on the list with the updated contact information. The server may also produce a hash of other recipient's e-mail addresses that are linked to the recipient's e-mail address and match the hash of the linked e-mail addresses with the transaction ID, with the server forwarding the contact information to the other e-mail addresses of the recipient.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

FIG. 1A depicts a system for managing contact information via a network;

FIG. 8 depicts an exemplary contact information in form of a "livecard" sent to a subscriber with an installed e-mail client add-in;

FIG. 9 depicts an exemplary contact information in form of a "livecard" sent to a subscriber without an e-mail client add-in; and FIG. 10 depicts an exemplary contact information in form of a "livecard" received by a subscriber without an e-mail client add-in.

DETAILED DESCRIPTION OF CERTAIN ILLUSTRATED EMBODIMENTS

Figure 1B:
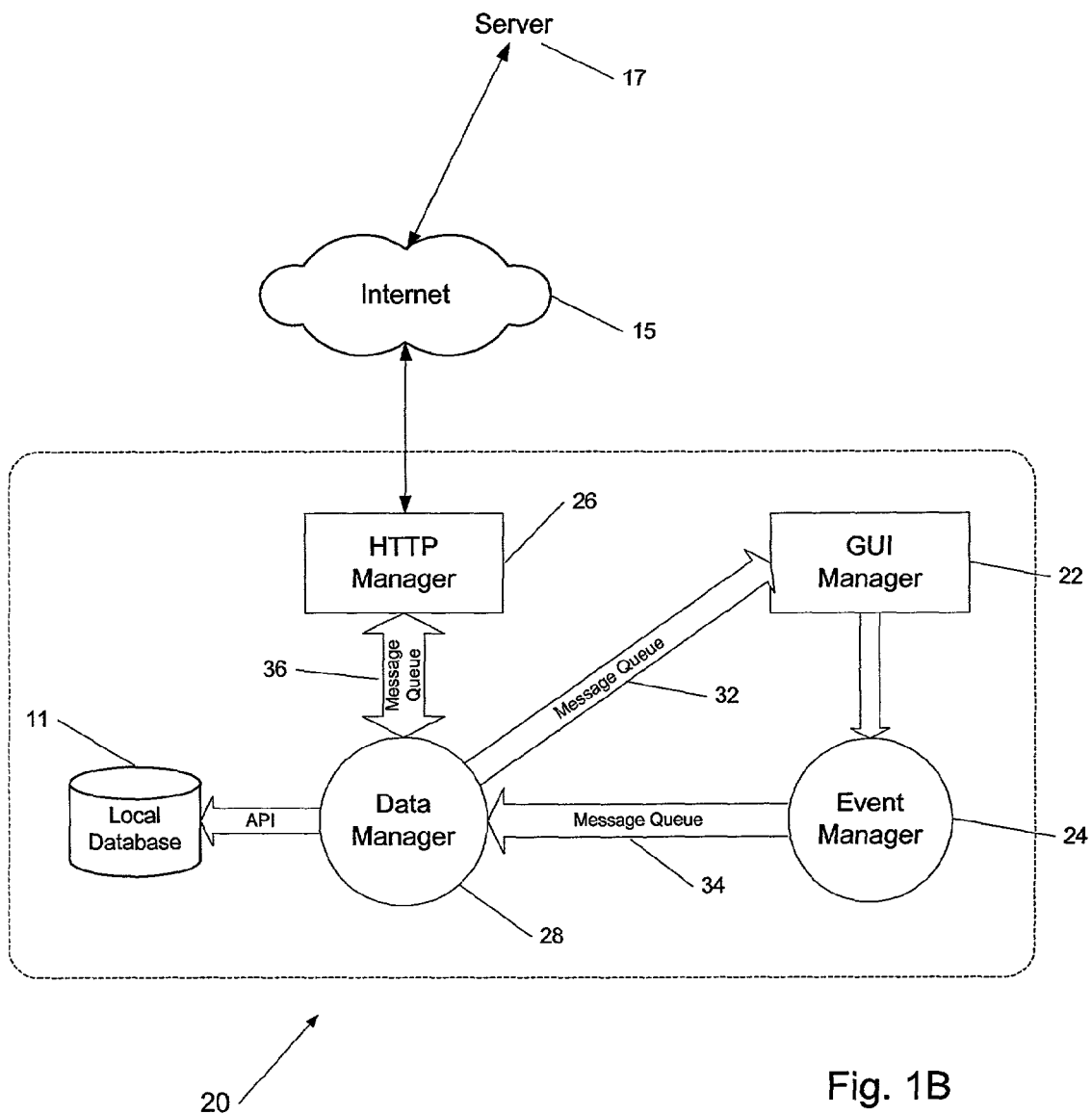
FIG. 1B depicts an e-mail client add-in application.

The invention is directed to methods and systems for managing contact information. In particular, the methods and systems for managing contact information described herein can securely acquire, maintain and update contact information using e-mail protocols.

Referring first to FIG. 1A, a system 10 includes client machines 12, 13 with associated local databases 11, 14, wherein the local databases 11, 14 may be internal to the client machines 12, 13. The system also includes a server 17, such as a server of a trusted party administering the contact information. The contact information can include, for example, personal, biographical or business-related data of the type commonly found on printed business cards, but may contain any other information, such as image, audio and video data, that may be of interest to a selected third party. The server 17 and the client machines 12, 13 can communicate with one another over a network 15, such as the Internet or a LAN. The server 17 connects to a proprietary database 16 which securely stores user identities and user contact information, as will be described in detail below.

For the depicted system, the client machines 12, 13 can be any suitable computer system such as a PC workstation, a handheld computing device, a wireless communication device, or any other such device, equipped with a network client capable of accessing a network server and interacting with the server 17 to exchange information with the server 17. The network client may be a web client, such as a web browser that can include the Netscape web browser, the Microsoft Internet explorer web browser or another proprietary web browser. The network client may also be an application that allows the user to exchange e-mail with a web server, such as Eudora™ distributed by Qualcomm, San Diego, Calif. The client machines 12, 13 and the server 17 can rely on an unsecure communication path, such as the Internet 14, for accessing services on the remote server 17. To add security to such a communication path, the client machines and the server can employ a security system, such as any of the conventional security systems that have been developed to provide to the remote user a secured channel for transmitting data aver the Internet. One such system is the Netscape secured socket layer (SSL) security mechanism that provides to a remote user a trusted path between a conventional web browser program and a web server.

The server 17 may be supported by a commercially available server platform, such as a Sun Sparc™ system running a version of the Unix operating system and running a server capable of connecting with, or transferring data between, any of the client machines. In the embodiment of FIG. 1, the server 17 may include a web server, such as the Apache web server or any suitable web server. The operation of the web server component at the server can be understood more fully from Laurie et al., Apache The Definitive Guide, O'Reilly Press (1997).

The server 17 may also include components that extend its operation to accomplish the transactions described herein, and the architecture of the server 17 may vary according to the application. For example, the web server may have built in extensions, typically referred to as modules, to allow the server to exchange information with the client machines and to operate on such information, or the web server may have access to a directory of executable files, each of which files may be employed for performing the operations, or parts of the operations, such as files required to create and encrypt ID's and data, as described in the present application. The client machines 12, 13 depicted in FIG. 1 are to be understood as being representative of a plurality of client machines 12, 13 that can communicate with the server 17 or with one another via the server 17.

In the following, it will be assumed that a user connects to a contact information service provided by the server 17. The user will subsequently also be referred to as subscriber or sender. The client machines host client application programs that can include a so-called "plug-in" 20 capable of analyzing transmitted and received e-mail messages to detect the presence of appended contact information. The plug-in can also separate the appended contact information from the e-mail body text so as to communicate the contact information to the server, while displaying only the e-mail body text to the subscriber. The operation of the system with and without a plug-in will be described below.

As depicted in FIG. 1B, the client machines 12, 13 may host an e-mail client add-in 20, also referred to as "plug-in", in form of a DLL that provides one or more particular functions, such as interfacing the e-mail contact management tasks with standard application programs, such as Microsoft Outlook™ or the Palm™ Desktop. The plug-in 20 interfaces with the network 15 for communication with server 17 through an HTTP Manager 26. The HTTP Manager 26 exchanges messages, such as e-mail and web page content, with a Data Manager 28 that interfaces with the local database 11 via an application program interface (API) to control access to the database 11. Any communication, such as e-mail with appended contact information, received by the Data Manager 28 can be transmitted via message queue 32 to a GUI Manager 22 adapted to provide, for example, a number of dialog boxes, information displays and interfaces for facilitating the convenient viewing, accessing, managing, forwarding and synchronizing the contact information.

A user can use the command available on the GUI Manager 28 to instruct an Event Manager 24 to schedule certain tasks relating to the management of contact information, such as having the Data Manager 28 synchronize contact information with the server 17 and/or a client machine.

Figure 2:
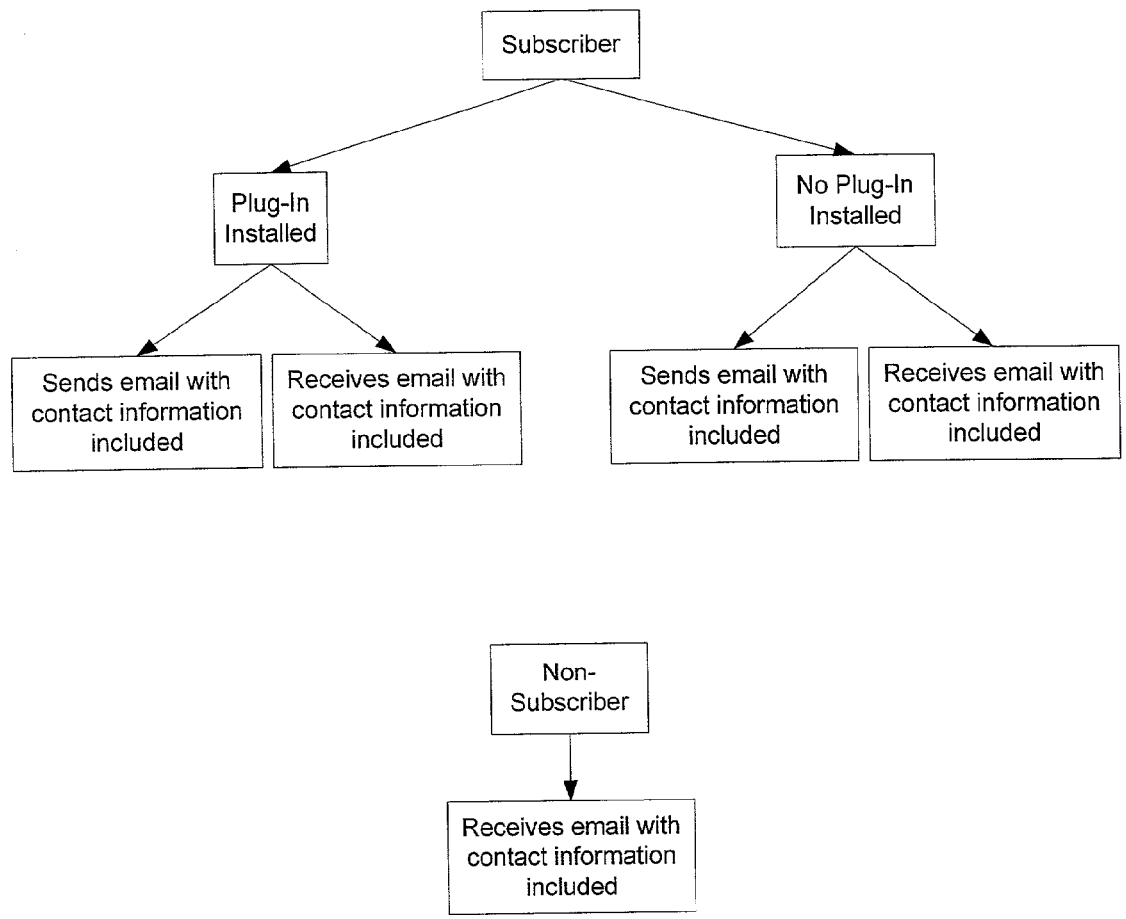
FIG. 2 is a high-level flow diagram for managing contact information.

Referring now also to FIG. 2, the following scenarios can be encountered in the system 10: (1) the subscriber has an installed plug-in and sends and receives contact information; (2) the subscriber does not have an installed plug-in and sends and receives contact information; and (3) the recipient of the e-mail with the appended contact information is not a subscriber of the services provided by the server 17. It will be assumed that only a valid subscriber can send the contact information using the server 17.

Referring now back to FIG. 1A, an exemplary transmission of contact information from a sender's (subscriber) client machine 12 to the client machine 13 of a recipient who may or may not be a subscriber, is indicated by the broken arrows 1, ..., 6. In the first transmission corresponding to arrow 1, it is assumed that the sender 12 has activated a SEND button, for example, in a browser window, indicating that he wishes to send contact information, such as an electronic business card, to the recipient 13. For security reasons, the database 16 of server 17 stores a correlation of the contact information of the sender and a hash and not the plain e-mail address(es) of the e-mail address(es) of the sender which are provided by the plug-in 20 installed in client machine 12.

In a first communication between the sender 12 and the server 17 via network 15, as indicated by arrow 1, the sender 12 sends the e-mail address(es) of the recipient(s), for example, in form of a hash generated by the plug-in of client machine 12, to the server 17. The server 17 searches database 16 for the contact information associated with the recipient(s) based on the transmitted e-mail address(es) of the recipient(s), as indicated by the arrow 2. This arrangement shields the identity of the receiving parties of the contact information from the service operating the server 17 until the contact information transmitted from the sender 12 to the recipient 13 is accepted by the recipient 13. It will be understood that the system 10 can include a plurality of senders 12 and recipients 13. The server 17 then responds with information relating to the contact information that is to be appended to the e-mail, as will be described in more detail below with reference to FIG. 3.

Optionally, the communication steps 1 to 3 above can be omitted, with the interaction and exchange of contact information between the sender 12 and the recipient 13 initiated in step 4, as described below.

Having composed the e-mail text message and appended the contact information, the subscriber 12 sends the e-mail to the recipient 13, as indicated by arrow 4. This communication can take place via an unsecured communication channel.

If the recipient is a valid subscriber of the service provided by the server 17, then the recipient 13 is made aware of receipt of new contact information by, for example, an e-mail message and/or a message displayed in a browser window, which occurrence will be communicated to the service provider, server 17, as indicated by arrow 5. The service provider 17 will respond back that new contact information is available and will transmit the new contact information to the recipient, for example, for display in a browser window, as indicated by arrow 6. The recipient can accept or decline the transmitted contact information.

If the recipient is not a valid subscriber of the service provided by the server 17, then the recipient 13 is made aware of receipt of new contact information by, for example, an URL link appended to the e-mail body and including the service provider's e-mail address. By clicking on this link, the non-subscriber accesses the service provider 17, as indicated by arrow 5. As will be explained below, the e-mail address includes an extension with a checksum generated by the sender and including the recipient's e-mail address or a hash of the recipient's e-mail address. The service provider can also compute a hash of the recipient's e-mail address and forwards the contact information to the recipient only if the two checksums or hash values agree, arrow 6.

Figure 3:
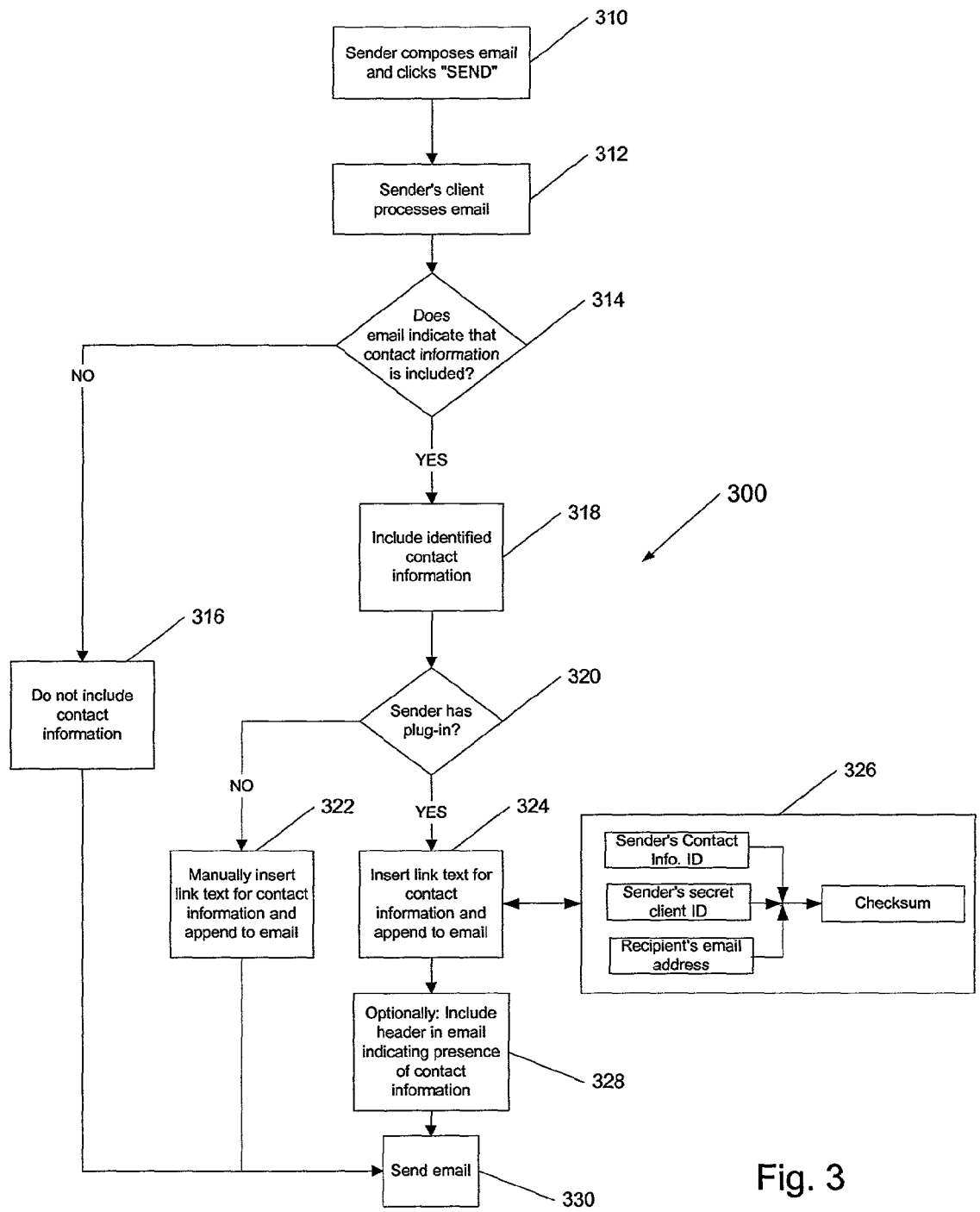
FIG. 3 is a detailed flow diagram for a registered client sending contact information.

Referring now to FIG. 3, a process flow 300 for sending e-mail with appended contact information is illustrated. The process flow 300 also illustrates the operation of the plug-in 20. A subscriber (sender) composes an e-mail message which may or may not include contact information, step 310. The e-mail message is processed by the senders client which detects if an e-mail message is appended, steps 312 and 314, respectively. If no contact information is appended, step 316, then the e-mail message is sent to a recipient, step 330. On the other hand, if the presence of appended contact information is detected in step 314, then the contact information is identified, step 318. In the event that the sender's client does not include a plug-in, as determined in step 320, the sender is prompted to manually insert the link text for the contact information and append the link text to the e-mail, step 322. As seen from FIG. 8 and briefly described above with reference to FIG. 1, the link text can include the e-mail address of the service provider and an extension identifying the recipient. It should be pointed out that sending the contact information without the plug-in weakens the security of the transmission.

Conversely, if the sender's client has a plug-in, then the link text will be inserted by the plug-in, step 324, together with a check sum computed in step 326 from the ID associated with the sender's contact information, a sender's secret ID and the recipient's e-mail address. This checksum will be used later to authorize the intended recipient to receive the contact information. An optional header can be inserted in the e-mail to indicate the presence of contact information, step 328, before sending the e-mail, step 330.

Figure 4:
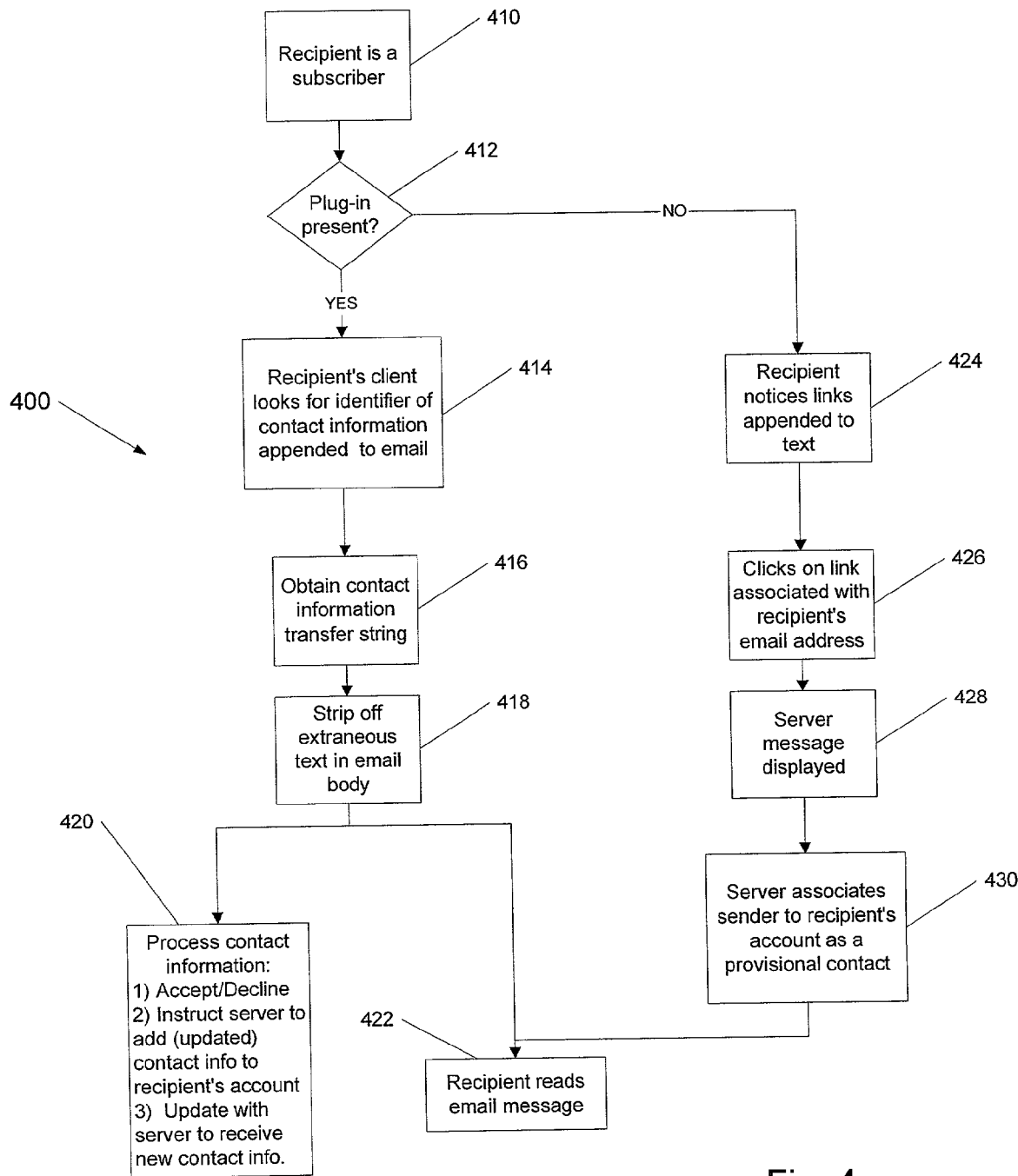
FIG. 4 is a detailed flow diagram for a registered client receiving contact information.

Referring now to FIG. 4, a recipient who is a valid subscriber, receives an e-mail with appended contact information, step 410. If no contact information is appended (this is not of interest for the present application), then the recipient just reads the e-mail, but does not communicate further with the server. The process 400 branches at step 412, depending whether or not a plug-in is provided at the recipient's client.

If the recipient has a plug-in, then the recipients client searches for an identifier in the e-mail, indicating that contact information is appended to the e-mail, step 414. The plug-in extracts the transfer string of the contact information, step 416, and strips off the extraneous text in the e-mail body not pertaining to the contact information, step 418. The the recipients can then process the contact information by (1) accepting or declining to the contact information; (2) instructing the server to update to the contact information in the recipients account; and/or to update the server to include a the contact information and link the contact information with the recipients (hashed) account identifier, step 420. The recipient is able to read the text body of the e-mail message, step 422, optionally with a note indicating to the reader that updated contact information was appended to the e-mail message.

If the recipient does not have a plug-in, as determined and step 412, then the recipient will notice the presence of links appended to the text of the e-mail message which include, for example, the Web address of the server that received the updated contact information from the sender, step 424. The recipient then clicks on the link associated with the recipients e-mail address, as displayed in the link, step 426. In response, the server can send a message to the recipient, according to recipient to the existence of updated contact information, which the recipient can either accept or decline, step 428. If the recipient accepts the contact information, then the server will associate the sender's contact information with the recipients account as a provisional contact, with the contact information being officially added at the next login of the recipient, step 430. Because of the absence of the plug-in, the link appended to the e-mail body text cannot be stripped from the message.

Figure 5:
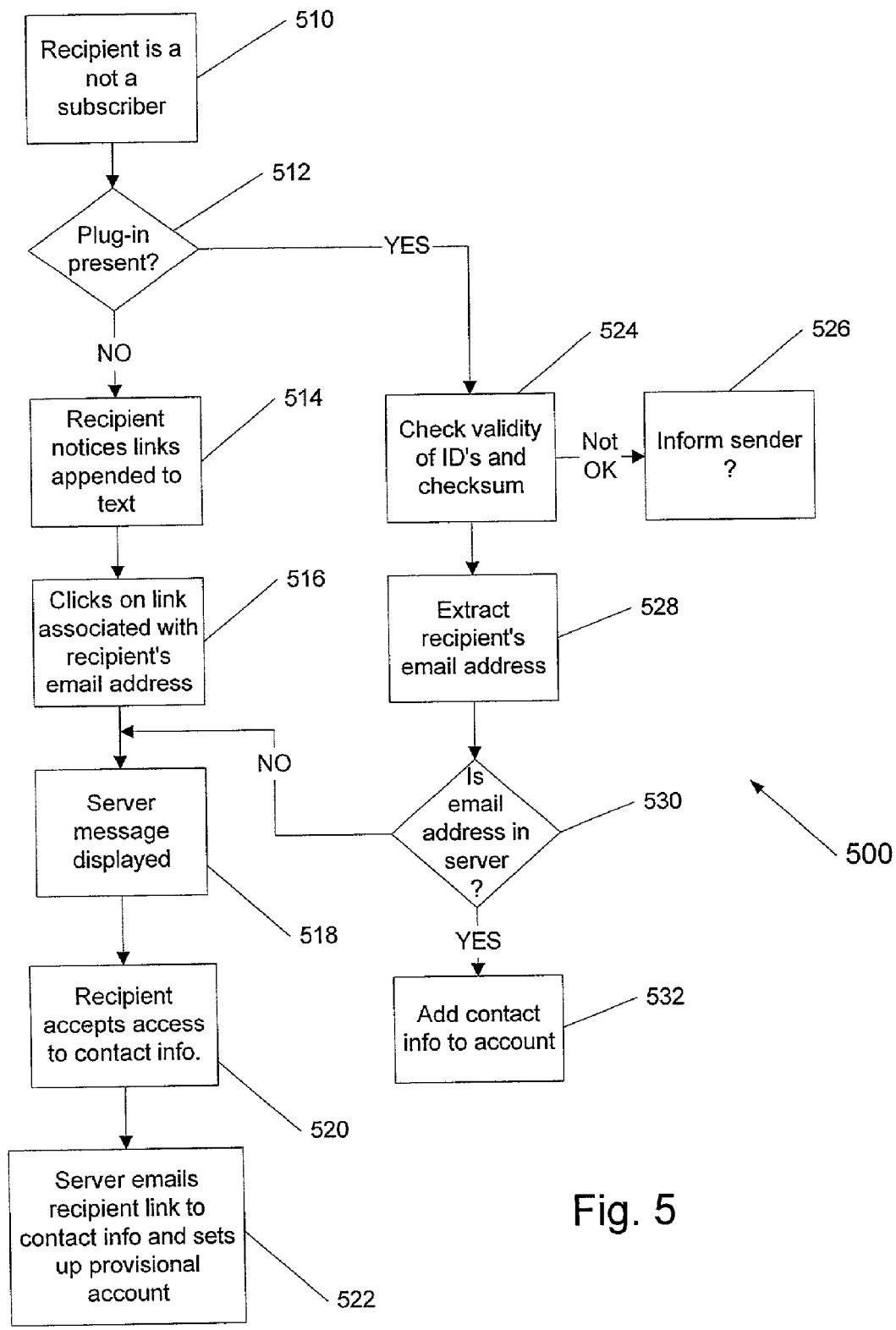
FIG. 5 is a detailed flow diagram for an unregistered client receiving contact information.

Referring now to FIG. 5, a process of 500 is described wherein contact information is sent to a recipient who is not a subscriber, step 510. However, although the recipient is not a subscriber, the recipient may have a plug-in, for example, left on the recipients client machine from a previous subscriber or subscription. If a plug-in is present, as determined in step 512, then the plug-in checks the validity of the ID's and verifies the checksum, step 524. If, for example, the checksum does not match the recipient's ID, then the sender may receive a message indicating a problem with the intended recipient, step 526. If the ID's and the checksum match, then the plug-in extracts the recipients e-mail address, step 528. If the e-mail address is stored in the server, as tested in step 530, then the contact information is added to the recipients account, step 532. If, on the other hand, the recipients e-mail address is not stored in the server, then the server sends a message to the recipient, step 518, informing the recipient of the presence of updated contact information, which the recipient can either accept or decline, step 520. If the recipient accepts the contact information, then the server will e-mail the recipient a link to the contact information and set up a provisional account, optionally inviting the recipient to subscribe to the services provided by the server.

If the recipient is not a subscriber and does not have a plug-in, then the the recipient will notice the presence of links appended to the text of the e-mail message which include, for example, the Web address of the server that received the updated contact information from the sender, step 514. The recipient then clicks on the link associated with the recipients e-mail address, as displayed in the link, step 516. In response, the server displays a message, step 518, informing the recipient of the presence of updated contact information, which the recipient can either accept or decline, step 520. If the recipient accepts the contact information, then the server will e-mail the recipient a link to the contact information and set up a provisional account, optionally inviting the recipient to subscribe to the services provided by the server.

Figure 6:
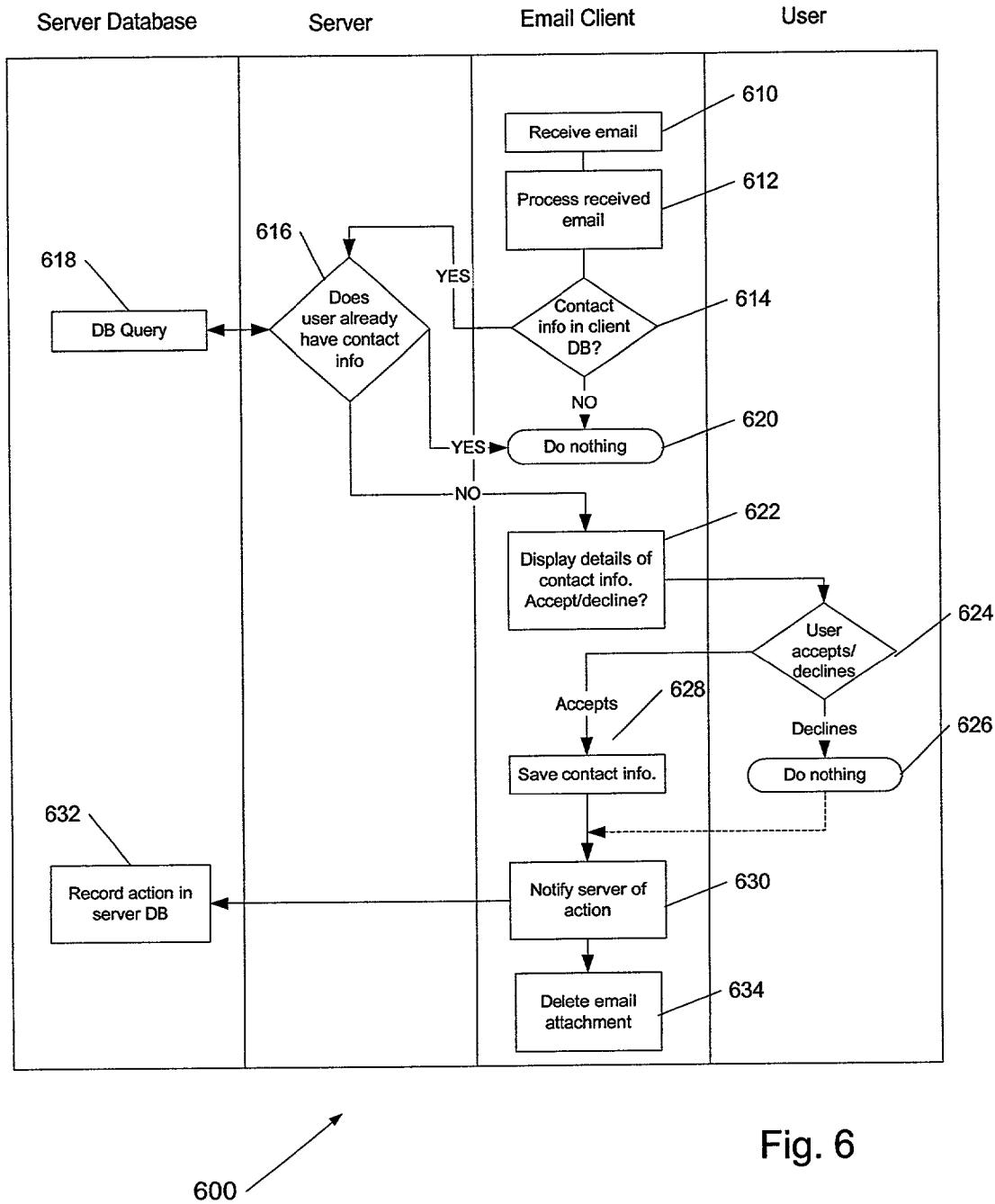
FIG. 6 shows the data flow between server and client for exchanging contact information.
Figure 7:
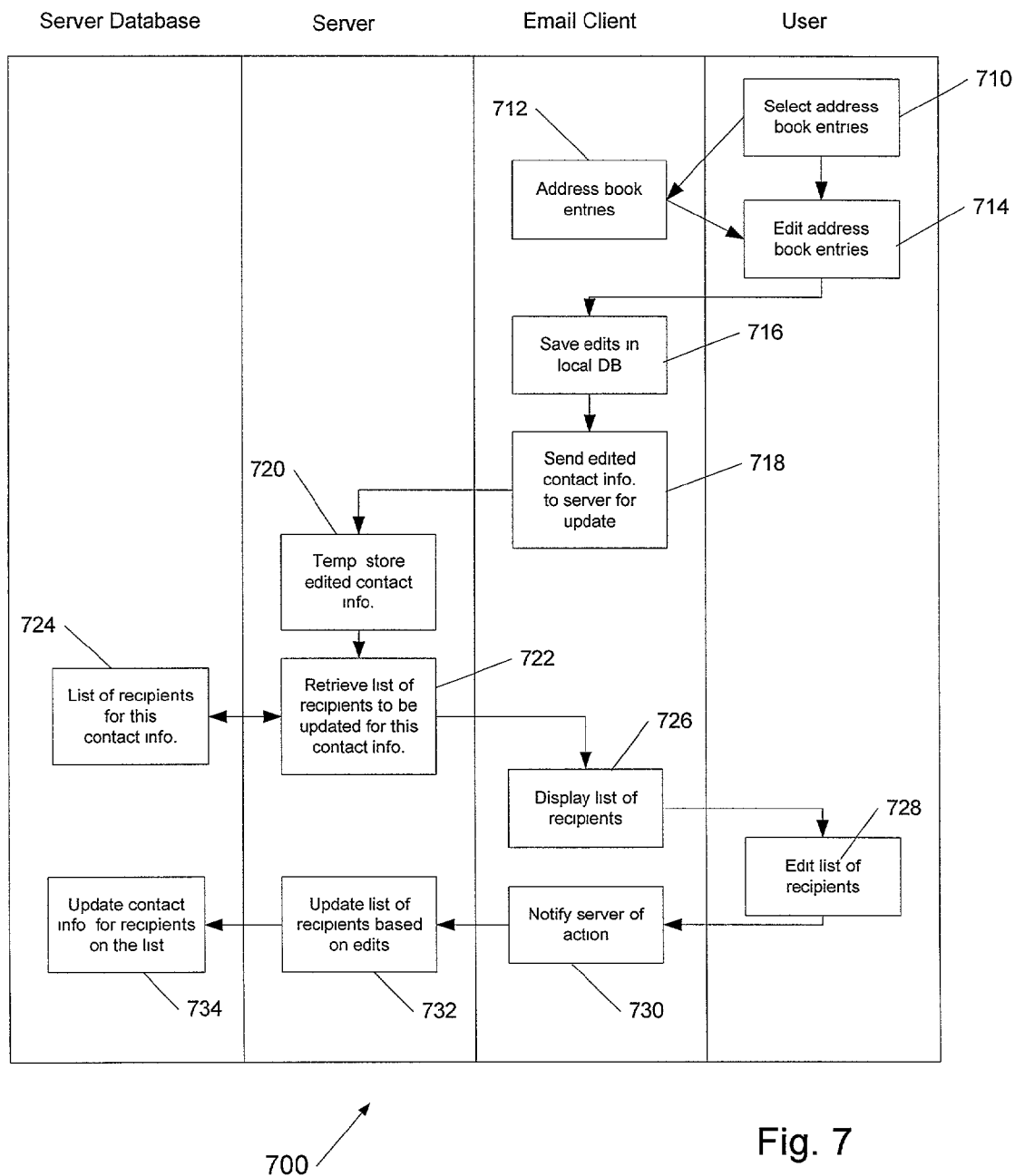
FIG. 7 shows the data flow between server and client for updating contact information.

FIGS. 6 and 7 depict the flow of information between the user/e-mail client and the server/server database when an e-mail client receives e-mail which may include contact information (FIG. 6), and when a user elects to update contact information in the server database and communicate the updates to users included in a list relating to this contact information (FIG. 7), respectively.

Referring now to FIG. 6, in a process 600, an e-mail client receives e-mail, step 610, and processes the receives e-mail, step 612. If no contact information is included in the e-mail, as determined in step 614, then only the e-mail is displayed without any further action on part of the e-mail client, step 620. If the e-mail, the other hand, includes contact information, as determined in step 614, then the server is queried to determine if the user already has the contact information, steps 616 and 618. As before, no action on part of the e-mail client is required if the user already has the contact information. On the other hand, if the user does not already have the contact information, then details of the contact information are displayed by the e-mail client, step 622, and the user can either accept or decline the contact information, step 624. If the user declines, step 626, then the process may notify the server, step 630, with the action being recorded in the server database, step 632, and the e-mail attachment with the contact information can be deleted from the e-mail body, step 624. Conversely, if the user accepts the (updated) contact information in step 624, the information is saved by the e-mail client, step 628, the server is notified, step 630, with the action being recorded in the server database, step 632, as before. The e-mail attachment can also be deleted, step 634.

The contact information stored in the local database and the server database can be edited and/or updated in several ways. In the exemplary process 700 depicted in FIG. 7, a user selects an address book entry, step 710, either manually or from a list of address book entries stored in the e-mail client, step 712, and edits the entry, step 714. The edits are saved in the local database of the e-mail client, step 716, and the edited contact information is transmitted to the server for synchronization with the server database, step 718. The server temporarily stores the edited contact information, step 720, and retrieves a list of recipients, which is preferably a hash of the recipients' e-mail addresses, that are associated with this contact information and need to be updated, step 722. The list of recipients may be retrieved from the server database, step 724. The list of the recipients to be updated can then be displayed to the editing user, step 726, and for the edited by the user, step 728. After the editors complete, the e-mail client notifies the server of the actions taken, step 730, but after the server updates the list of the recipients based on the edits, step 732. The updated contact information for the recipients is stored on the server database, step 734.

FIGS. 8–10 depict various exemplary formats for textual contact information sent via e-mail to a recipient. In the embodiment illustrated in FIG. 8, the contact information is sent in form of a so-called "livecard" to a recipient who is a subscriber and equipped with a plug-in. The plug-in recognizes the last text entry "My business livecard is included" and will obtain from the server the updated contact information of the sender. Conversely, as depicted in FIG. 9, if the recipient is a subscriber, but the sender does not have a plug-in, then the sender includes the service provider's e-mail address with an extension showing the sender's ID, The recipient can obtain the updated contact information by clicking on the link.

In another embodiment, a recipient may not have a plug-in, as shown in FIG. 10. The recipient then clicks on his/her e-mail address link to obtain the contact information update from the service provider.

While the invention has been disclosed in connection with the preferred embodiments shown and described in detail above, various modifications and improvements thereon will become readily apparent to those skilled in the art. For example, contact information ("livecards") can be categorized by populating certain fields, i.e., "livecards" can be associated with different functions and purposes. One set of livecards can be for private use, whereas another set of livecards can be intended for business use, optionally with different logos. The user can compile a master list of personal details select subsets thereof for various types of cards, each of which carry the selection of these fields. Before a field in a card which carries that field that is to be updated, is actually updated, the user can view the new update as well as the name of the person(s) receiving the update before sending it out. The user has the chance to take a person off the update list and can send an update message out with the update, as shown in FIGS. 8–10.

The user also has the opportunity to permanently remove a person from the contact information list. In the proposed embodiments, contact entries with e-mail addresses are being processed, i.e., the present process works with e-mail folders. A default setting could be that the contact information is being forwarded, with the user being able to specify which contact information is being sent. Updates can be time-triggered with configurable settings or performed manually. Each e-mail that is received is being scanned for a livecard tag, without interrupting the user's activities. The user should also be able to read the e-mail body text off-line without being interrupted by the life livecard utility.

Livecards have associated therewith certain security levels. For example, a lowest security level may be where all information is displayed via URL code and anyone can subscribe to it; a higher security level may display the contact information via URL or code, anyone can request subscription, but only intended recipients can subscribe to; and at a still higher security level, nothing is displayed via URL or code, but subscription is available for intended recipients. To enforce the security code, every livecard can carry a public code that is printed on the livecard and activated when the recipient activates the livecard URL link. The service provider's web site will give access to the card according to the security level set for that card. For example, the code "876" displayed in FIG. 9 after the name "Bob" can represent such a security code.

Every e-mail address is treated specially since an e-mail address is a legitimate reception point for a livecard. Each e-mail address will carry a status indicating whether it has been validated or not. The process of validation may involve e-mailing the user a secret sentence with the user then needs to retransmit to the server.

Live cards are particularly useful in environments where a large number of contacts have to be notified, for example, as a result of an organizational change, a change of location or a change in phone numbers. For example, if a team member is promoted, a respective entry can be changed in the member's livecard, and contacts receiving the livecards where the specific contact field is activated, will receive the updated information, for example as described above, with an e-mail message describing particular circumstances of the changes.

Accordingly, the spirit and scope of the present invention is to be limited only by the following claims.

I claim:

1. Method for secure management of contact information via a network, comprising:
   attaching contact information to an e-mail having a recipient's e-mail address,
   associating a transaction ID with the contact information,
   associating a first hash of the recipient's e-mail address with the transaction ID,
   transmitting the e-mail with the transaction ID to the recipient via the network,
   receiving from the recipient a message including the transaction ID and producing a second hash of the recipient's e-mail address, and if the second hash of the recipient's e-mail address and the transaction ID match the first hash of the recipient's e-mail address and the transaction ID, forwarding the contact information to the recipient.

2. The method of claim 1, wherein attaching the contact information includes checking if the recipient already has a most recent copy of the contact information.

3. The method of claim 1, wherein a presence of the contact information is identified in the e-mail by a message appended to the e-mail.

4. The method of claim 1, wherein a presence of the contact information is identified in the e-mail by a field checked in an e-mail window.

5. The method of claim 1, wherein the contact information is directed to a specified recipient.

6. The method of claim 1, wherein the contact information is directed to a plurality of recipients listed on a recipient list.

7. The method of claim 1, further including retaining a history of the forwarded contact information.

8. The method of claim 7, wherein the history of the contact information is associated with the transaction ID.

9. The method of claim 1, wherein the recipient scans a received e-mail for an indication of the presence of updated contact information.

10. The method of claim 1, wherein a new contact information entry is created at the recipient if the recipient does not currently have the contact information.

11. The method of claim 1, wherein the recipient—in response to receiving the forwarded contact information—transmits updated recipient contact information.

12. The method of claim 1, further including associating security settings with the contact information, with the security settings determining the forwarded contact information displayed at the recipient.

13. The method of claim 6, wherein when a recipient on the recipient list receives updated contact information, said updated contact information is automatically sent to the remaining recipients on the recipient list.

14. The method of claim 1, wherein the recipient has additional e-mail addresses that are linked to the recipient's e-mail address, and the updated contact information is forwarded to the linked e-mail addresses using the same transaction ID.

15. Method for secure management of contact information over a network, comprising:
   associating a transaction ID with the contact information,
   computing a hash of an e-mail address of an intended recipient of the contact information,
   associating the hashed e-mail address with the transaction ID and when the intended recipient requests the contact information, computing a second hash of the recipient's e-mail address associated with the request, matching the second hashed recipient's e-mail address with the first hashed e-mail address for the transaction ID, and if the first and second hashed e-mail addresses agree, transmitting the contact information to the recipient.

16. A system for disseminating contact information via a network, comprising:
   a server connected to the network and storing the contact information,
   a sender's computer connected to the network and transmitting via the network to a recipient's e-mail address an e-mail that includes an identifier associated with the sender's contact information,
   a recipient's computer connected to the network and receiving the e-mail with the identifier, the recipient's computer accessing the server via the network and retrieving from the server the contact information by providing the server with the identifier and wherein the server stores an association between the contact information and the recipient's e-mail address based on an encrypted value of the recipient e-mail address and the identifier is a transaction ID of the contact information.

17. The system of claim 16, wherein the identifier and the recipient's e-mail address define the contact information retrieved from the server.

* * * * *